United States Patent
Benko et al.

(10) Patent No.: US 9,122,341 B2
(45) Date of Patent: Sep. 1, 2015

(54) RESOLVING MERGED TOUCH CONTACTS

(75) Inventors: Hrvoje Benko, Seattle, WA (US); Andrew Wilson, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 160 days.

(21) Appl. No.: 12/941,693

(22) Filed: Nov. 8, 2010

(65) Prior Publication Data

US 2012/0113017 A1 May 10, 2012

(51) Int. Cl.
*G06F 3/041* (2006.01)
*G06F 3/044* (2006.01)

(52) U.S. Cl.
CPC ............. *G06F 3/0416* (2013.01); *G06F 3/044* (2013.01)

(58) Field of Classification Search
CPC ........ G06F 3/041; G06F 3/0416; G06F 3/044
USPC ......................................................... 345/173
See application file for complete search history.

(56) References Cited

U.S. PATENT DOCUMENTS

| 5,825,352 | A | * | 10/1998 | Bisset et al. | ................. | 345/173 |
|---|---|---|---|---|---|---|
| 5,856,822 | A | | 1/1999 | Du et al. | | |
| 5,943,043 | A | | 8/1999 | Furuhata et al. | | |
| 6,671,406 | B1 | * | 12/2003 | Anderson | ..................... | 382/217 |
| 6,856,259 | B1 | | 2/2005 | Sharp | | |
| 7,254,775 | B2 | | 8/2007 | Geaghan et al. | | |
| 7,295,191 | B2 | | 11/2007 | Kraus et al. | | |
| 7,619,618 | B2 | | 11/2009 | Westerman et al. | | |
| 8,217,909 | B2 | * | 7/2012 | Young | ............................ | 345/173 |
| 2006/0097991 | A1 | | 5/2006 | Hotelling et al. | | |
| 2008/0158185 | A1 | | 7/2008 | Westerman | | |
| 2008/0309629 | A1 | | 12/2008 | Westerman et al. | | |
| 2009/0174679 | A1 | | 7/2009 | Westerman | | |
| 2010/0073318 | A1 | * | 3/2010 | Hu et al. | ....................... | 345/174 |
| 2010/0117962 | A1 | | 5/2010 | Westerman et al. | | |
| 2010/0315372 | A1 | * | 12/2010 | Ng | ............................... | 345/174 |
| 2011/0141054 | A1 | * | 6/2011 | Wu et al. | ....................... | 345/174 |

(Continued)

FOREIGN PATENT DOCUMENTS

CN 1942853 A 4/2007
EP 2077490 A2 7/2009

(Continued)

OTHER PUBLICATIONS

Dang, et al., "Hand Distinction for Multi-Touch Tabletop Interaction", Retrieved at << http://mm-werkstatt.informatik.uni-augsburg.de/files/publications/259/tabletop-dang.pdf >>, Proceedings of the ACM International Conference on Interactive Tabletops and Surfaces, Nov. 23-25, 2009, pp. 8.

(Continued)

*Primary Examiner* — Ryan A Lubit
*Assistant Examiner* — Yaron Cohen
(74) *Attorney, Agent, or Firm* — Jeremy Snodgrass; Judy Yee; Micky Minhas (57) ABSTRACT

A method for resolving merged contacts detected by a multi-touch sensor includes resolving a first touch contact to a first centroid(N) for a frame(N) and resolving a second touch contact, distinct from the first touch contact, to a second centroid(N) for the frame(N). Responsive to the first touch contact and the second touch contact merging into a merged touch contact in a frame(N+1), the merged touch contact is resolved to a first centroid(N+1) and a second centroid(N+1).

27 Claims, 5 Drawing Sheets

(56) References Cited

U.S. PATENT DOCUMENTS

| | | | |
|---|---|---|---|
| 2011/0304577 A1* | 12/2011 | Brown et al. | 345/174 |
| 2012/0075331 A1* | 3/2012 | Mallick et al. | 345/594 |
| 2012/0105334 A1* | 5/2012 | Aumiller et al. | 345/173 |

FOREIGN PATENT DOCUMENTS

| | | | |
|---|---|---|---|
| WO | 9938149 | A1 | 7/1999 |
| WO | 2005114369 | A2 | 12/2005 |

OTHER PUBLICATIONS

State Intellectual Property Office of the People's Republic of China, Notice of Allowance Issued in CN201110349777.5, May 28, 2014, 6 pages.

ISA European Patent Office, Extended European Search Report Issued in EP11840170.2, Jul. 16, 2014, 10 pages.

* cited by examiner

RESOLVING MERGED TOUCH CONTACTS

BACKGROUND

The use of small touch sensor devices is becoming increasingly common. For example, touch screens, game controllers, and mice can all utilize touch sensors to detect user input. When performing multi-touch gestures on a small touch sensor device, fingers tend to be close together. Standard touch processing on the sensor image often results in confusion when multiple touch contacts are arranged close to each other. Frequently, the contacts are reported as a single touch contact when they actually arise from multiple independent contacts. For example, if two fingers are moving close together (e.g. during a pinching gesture) at some point the two independent contacts can become so close together that they are reported as a single contact. This can be problematic in situations where it is necessary to maintain tracking of the independent contacts.

SUMMARY

Two or more touch contacts that merge together may be resolved. One embodiment comprises resolving a first touch contact to a first centroid(N) for a frame(N) and resolving a second touch contact, distinct from the first touch contact, to a second centroid(N) for the frame(N). Responsive to the first touch contact and the second touch contact merging into a merged touch contact in a frame(N+1), the merged touch contact is resolved to a first centroid(N+1) and a second centroid(N+1). Any number of merged contacts may be resolved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Methods for resolving merged contacts detected by a multi-touch sensor are disclosed. When a user touches a multi-touch sensor the sensor attempts to track the user's touch as a touch contact. It can be difficult to independently track two or more contacts when such contacts approach one another and appear to merge into a merged touch contact. The methods provide for resolving the merged touch contact into the two or more separate touch contacts so that the two or more separate touch contacts can be independently tracked even when the two or more touch contacts appear to the sensor to be merged.

Figure 1:
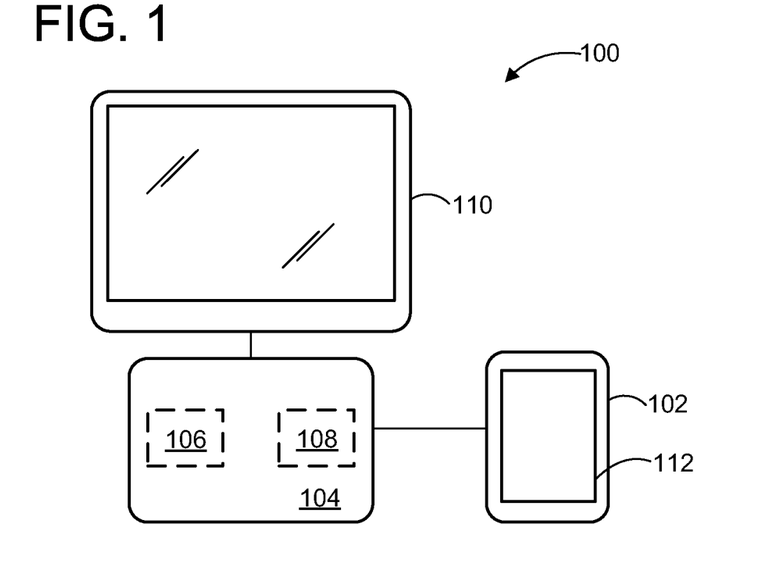
FIG. 1 shows an example usage environment in accordance with an embodiment of the present disclosure.

FIG. 1 shows an example usage environment 100 including a multi-touch sensor 102. A computing system 104 including a logic subsystem 106 and a data-holding subsystem 108 is configured to interpret information received from the multi-touch sensor so that a user's touch on the sensor can be resolved to a location. In this example, the multi-touch sensor 102 is a peripheral component to the computing system 104. In other embodiments, the sensor alone could be configured to resolve touch-contact locations.

As illustrated, multi-touch sensor 102 comprises a touch pad 112. In other examples, the multi-touch sensor may include a mouse, touch screen, game controller, etc. A multi-touch sensor in accordance with the present disclosure may detect touch input optically, capacitively, resistively, or in any other suitable manner.

Figure 2:
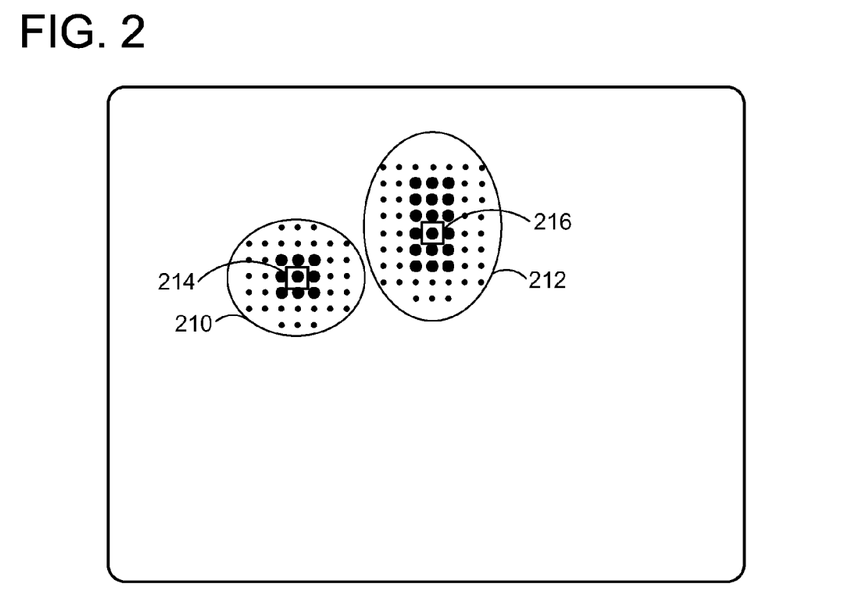
FIG. 2 is a schematic representation of raw sensor measurements of two independent touch contacts.

FIG. 2 schematically shows raw sensor measurements of a first touch contact 210 and a second touch contact 212, distinct from the first touch contact. Using any suitable detection mechanism, the touch contacts are resolved to two distinct touch-contact locations. In the drawings, each dot represents a pixel location. The relative size of each dot is representative of the confidence of the touch sensor that something is touching it at that location. Each touch contact has a centroid—e.g., centroid 214, centroid 216, etc.—representing the mean central location of the contact. In this embodiment, each centroid corresponds to a single pixel. In other embodiments, the centroid could correspond to more than or less than one pixel. The centroid calculation may have sub-pixel precision. The touch sensor measures touch contacts in successive frames over time. FIG. 2 represents one such frame, referred to as frame(N).

Figure 3:
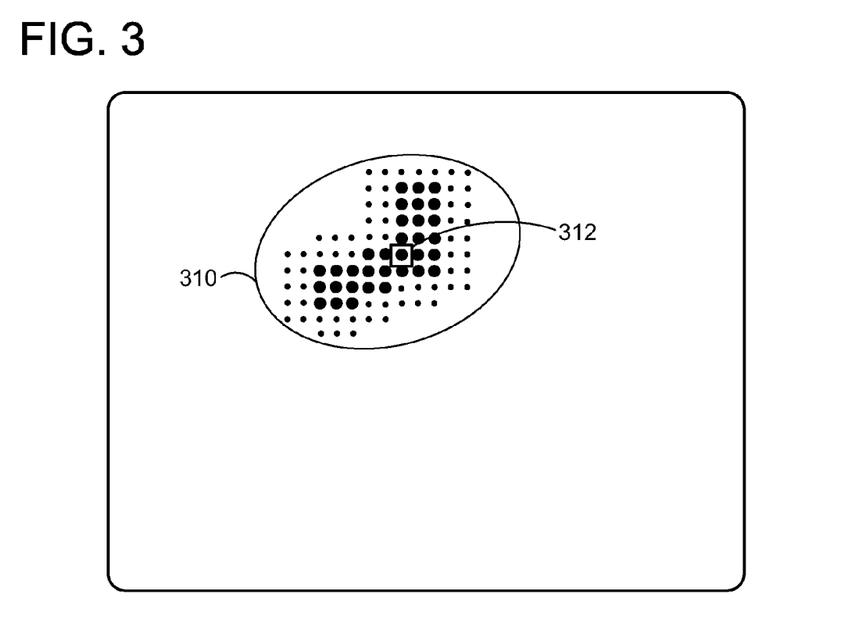
FIG. 3 is a schematic representation of raw sensor measurements of a merged touch contact.

FIG. 3 schematically shows raw sensor measurements of a touch contact 310 in a subsequent frame(N+1). As used herein, the (N) and (N+1) notation is used to indicate the temporal sequence of frames. That is, frame(N+1) is one frame after frame (N), frame(N+2) is one frame after frame (N+1), and so on. The first touch contact 210 and the second touch contact 212 from FIG. 2 have now merged into a merged touch contact 310. In this example, the merged touch contact appears to the sensor as a single contact with a single centroid 312, even though the merged touch contact results from two distinct fingers touching the sensor.

Figure 4:
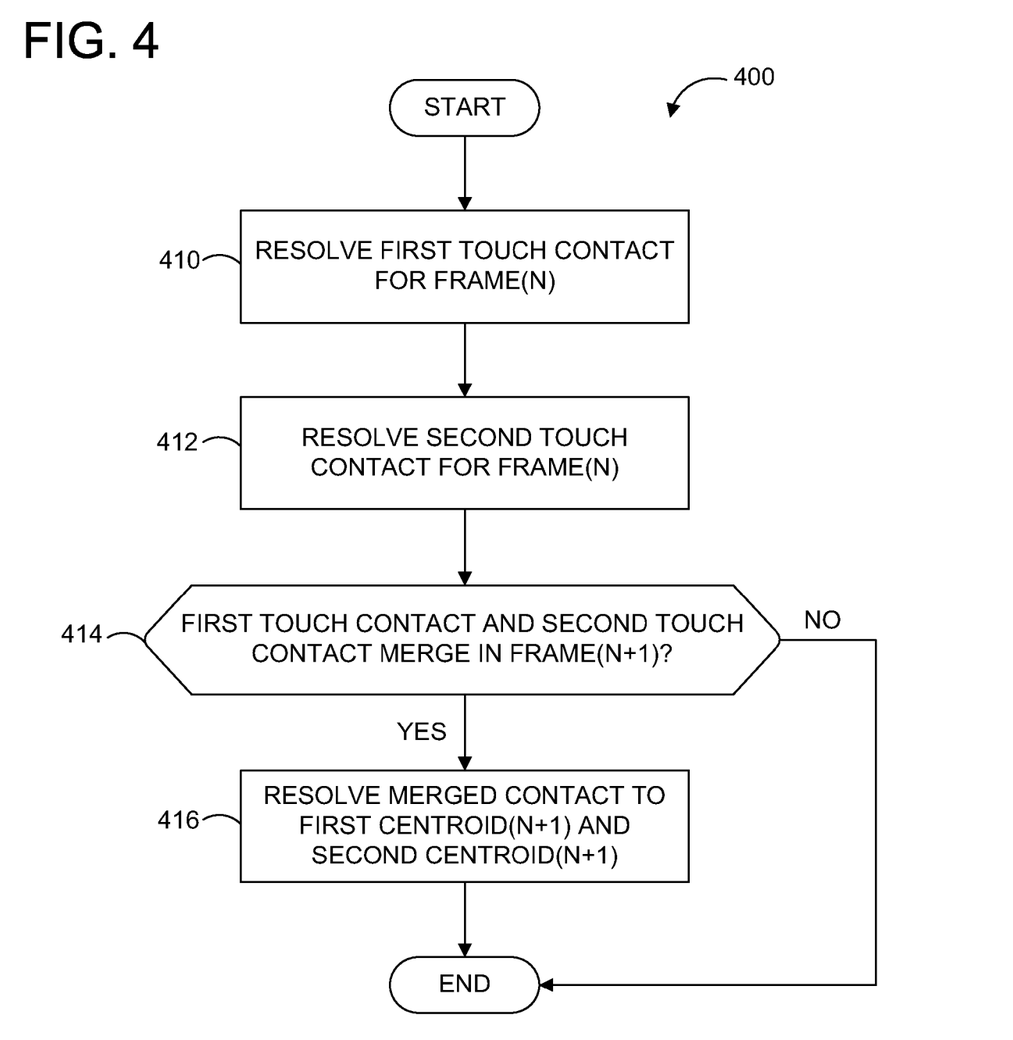
FIG. 4 shows an example method of tracking touch contacts on a multi-touch sensor.

FIG. 4 shows an example method 400 of tracking touch contacts on a multi-touch sensor. This example method describes tracking two touch contacts that have merged. However, tracking more than two touch contacts that have merged is within the scope of this disclosure. At 410, method 400 includes utilizing standard tracking methods to resolve a first touch contact to a first centroid(N) for a frame(N). A second touch contact, distinct from the first touch contact, is resolved to a second centroid(N) for the frame(N) at 412. This tracking will continue in a similar manner in the subsequent frame(N+1) if the first touch contact and second touch contact remain distinct. Responsive to the first touch contact and the second touch contact merging into a merged touch contact in a frame(N+1) at 414, a method 416 is initiated to resolve the merged touch contacts.

Method 416 may be initiated by identifying a continuous contact in frame(N+1) having a combined statistic approximately equal to a sum of an individual statistic of the first touch contact and an individual statistic of the second touch contact from frame(N). A nonlimiting example of such a statistic is the area of the touch contact. For example, if the area of a merged touch contact in frame(N+1) is approximately equal to the combined area of the separate touch contacts in frame(N), the merged contact may be verified. A continuous contact may additionally and/or alternatively be verified if the covariance of the merged contact is substantially equal to the combined covariance of the individual contacts in a previous frame.

Method 400 may alternatively be initiated by a "merged on landing" touch contact where a user adds a new contact adjacent to an existing touch contact. This is identified by a rapid expansion of a single touch contact size from frame(N) to frame(N+1). In other words, there may not yet be a second touch contact in frame(N), and thus step 412 of method 400 may be skipped.

Figure 5:
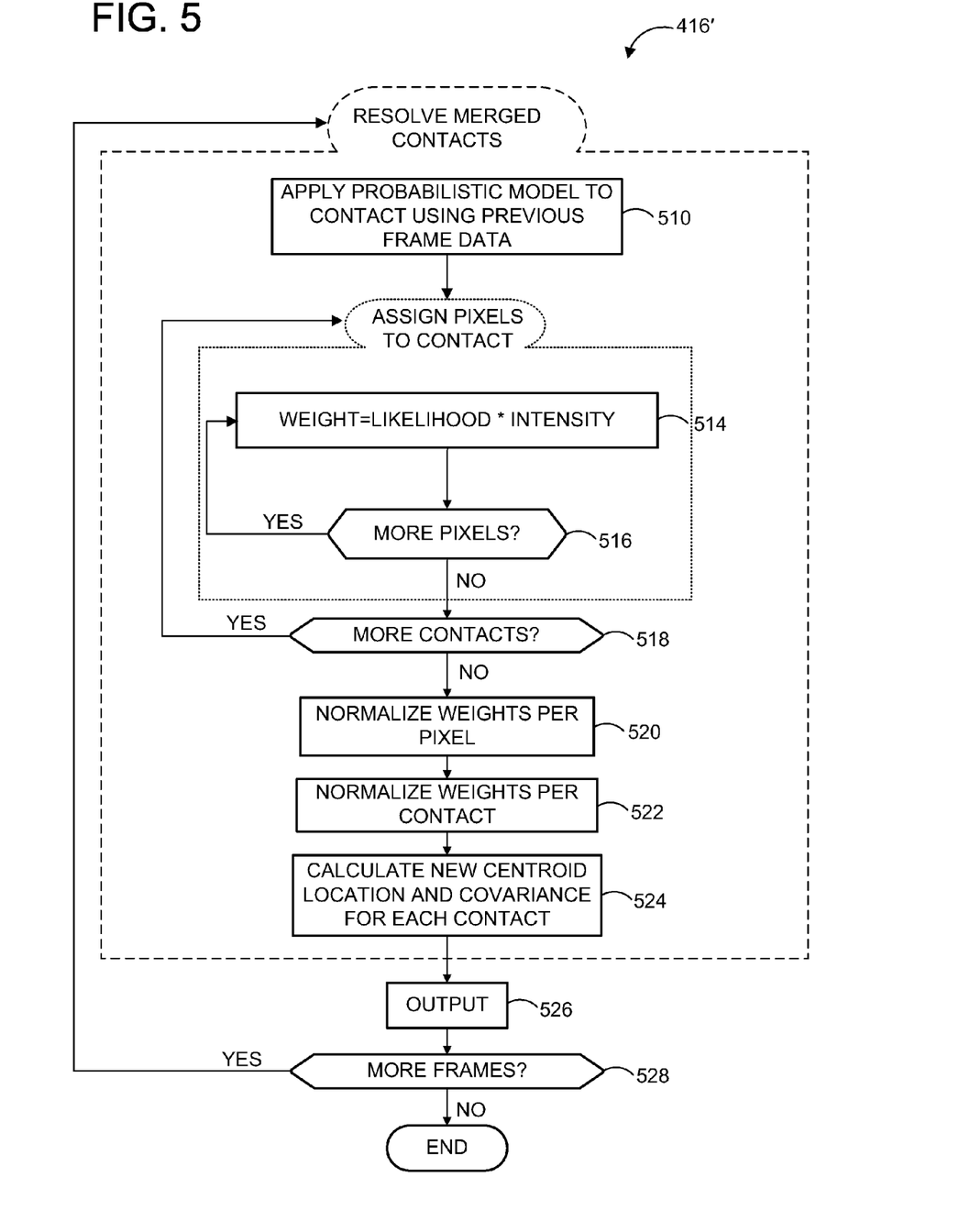
FIG. 5 shows an example method of resolving a merged touch contact on a multi-touch sensor.

FIG. 5 shows an example method 416' of resolving a merged touch contact, such as merged touch contact 310 identified in FIG. 3.

At 510, one or more probabilistic likelihoods are applied to each pixel of the merged touch contact. The probabilistic likelihood(s) may be calculated using data from each touch contact from the previous frame(N). In other words, the mean and covariance values from the previous frame may be used to calculate the current likelihood that a particular pixel from the merged touch contact belongs to a particular touch contact. In one example embodiment, the probabilistic likelihood includes a Gaussian distribution for each touch contact. The Gaussian distribution can be calculated using the following equation:

$$\frac{1}{(2\pi)^{k/2}|\Sigma|^{1/2}} e^{-\frac{1}{2}(x-\mu)'\Sigma^{-1}(x-\mu)}$$

where x is the current pixel location, μ is the mean location of the Gaussian model, Σ is the covariance matrix, and k is 2 as this is a two dimensional model. Any suitable probabilistic likelihood could be used, such as mean and standard variation, Poisson distribution, etc.

At 514, the probabilistic likelihood may be used to weight each pixel with respect to each of the instantiated probabilistic likelihoods from each touch contact of the previous frame. As an example, for each particular pixel of the merged touch contact, a first weight(N+1) with respect to the probabilistic likelihood from the first touch contact may be calculated. In some embodiments, the first weight(N+1) may be calculated as a product of an intensity of the merged touch contact observed at that particular pixel in frame(N+1) and the probabilistic likelihood that particular pixel belongs to the first touch contact based on the first centroid(N) for frame(N). The likelihood that each pixel belongs to the first touch contact may be calculated by means of a Gaussian distribution using data from the previous frame as described above. The intensity of the merged touch contact observed at each pixel can be acquired from raw and/or processed touch-sensor measurements.

At 516, the process is repeated for each pixel of the merged contact. At 518, the process is repeated for the probabilistic likelihood from the second, and any subsequent, touch contact. In this manner, each pixel from the merged touch contact is assigned a weight for each of the instantiated probabilistic likelihoods from each distinct touch contact that formed the merged touch contact. As an example, if two distinct touch contacts form the merged touch contact, each pixel of the merged touch contact will be assigned a first weight representing the likelihood that pixel results from the first touch contact and a second weight representing the likelihood that pixel results from the second touch contact.

Continuing with the example in which two distinct touch contacts are merged, after each pixel in the merged contact has been assigned a first weight(N+1) and a second weight (N+1), the weights are normalized at 520 for each pixel such that a sum of the first weight(N+1) and the second weight(N+1) equals 1. At 522, each pixel is normalized with respect to each model, such that a sum of first weights(N+1) of all pixels of the merged touch contact equals 1, and that a sum of second weights(N+1) of all pixels of the merged touch contact equals 1.

At 524, the merged touch contact is resolved to a first centroid(N+1) of normalized first weights(N+1) with associated mean and covariance matrix and a second centroid(N+1) of normalized second weights(N+1) with associated mean and covariance matrix. The first centroid(N+1) and second centroid(N+1) may be calculated as the weighted means of normalized first or second weights(N+1) where R is a set of pixel locations belonging to the contact under consideration:

$$\mu = \sum_{k \in R} w_k x_k.$$

The associated covariance matrices may be calculated as a summation over a set of pixels R that belong to the original merged contact:

$$\Sigma = [q_{ij}]$$

where $$q_{ij} = \frac{\sum_{k \in R} w_k (x_{ki} - \bar{x}_i)(x_{kj} - \bar{x}_j)}{1 - \sum_{k \in R} w_k^2}.$$

The resolved contacts may be output at 526. The resolved contacts may be output in any suitable format to any suitable recipient. As one nonlimiting example, each touch contact may be output as a data package including a contact identifier, a centroid location, and a covariance matrix. Each touch contact may be output to an operating system or other user interface module that is configured to interpret the touch contacts as user input events.

The mean and covariance values calculated at 524 may be used at 528 to instantiate a model for a subsequent frame.

Figure 6:
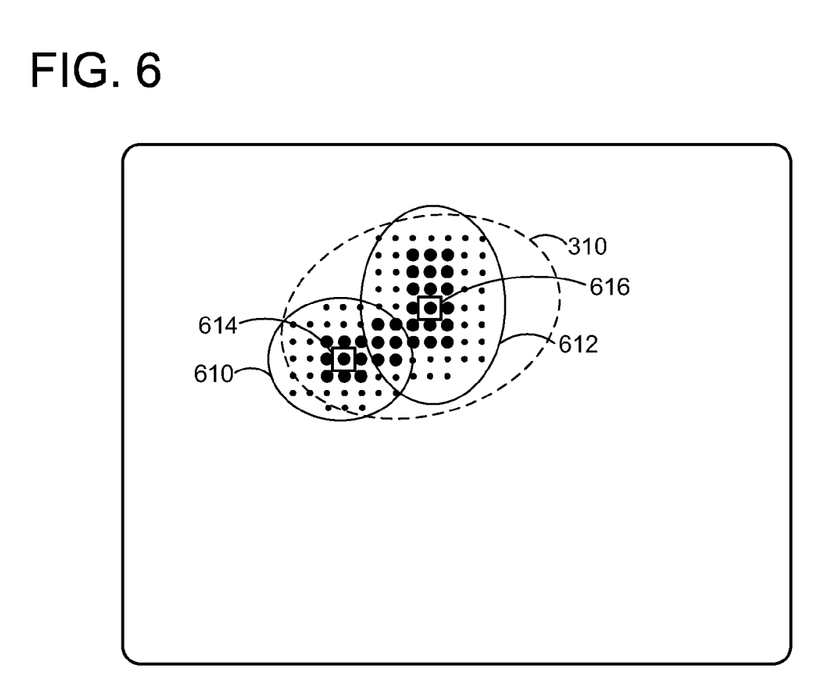
FIG. 6 is a schematic representation of raw sensor measurements of a resolved merged touch contact.

FIG. 6 shows the merged touch contact 310 from FIG. 3 in dashed lines. FIG. 6 also shows the merged touch contact resolved into a first touch contact characterized by a first centroid(N+1) 614 with an associated covariance matrix 610 and a second touch contact characterized by a second centroid (N+1) 616 with an associated covariance matrix 612.

In some embodiments, the above described methods and processes may be tied to a computing system including one or more computers. In particular, the methods and processes described herein may be implemented as a computer application, computer service, computer API, computer library, and/or other computer program product.

Returning to FIG. 1, a nonlimiting computing system 104 may perform one or more of the above described methods and processes. Computing system 104 is shown in simplified form. It is to be understood that virtually any computer architecture may be used without departing from the scope of this disclosure. In different embodiments, computing system 104 may take the form of a mainframe computer, server computer, desktop computer, laptop computer, tablet computer, home entertainment computer, network computing device, mobile computing device, mobile communication device, gaming device, peripheral input device, etc.

Computing system 104 includes a logic subsystem 106 and a data-holding subsystem 108. Computing system 104 may optionally include a display subsystem 110, communication subsystem, and/or other components not shown in FIG. 1. Computing system 104 may also optionally include one or more peripheral and/or integrated user input devices such as keyboards, mice, game controllers, cameras, microphones, and/or touch screens, which may include touch input capability. As a nonlimiting example, computing system 104 may include multi-touch sensor 102.

Logic subsystem 106 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 108 may include one or more physical, non-transitory, devices configured to hold data and/or instructions executable by the logic subsystem to implement the herein described methods and processes. When such methods and processes are implemented, the state of data-holding subsystem 108 may be transformed (e.g., to hold different data).

Data-holding subsystem 108 may include removable media and/or built-in devices. Data-holding subsystem 108 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 108 may include devices with one or more of the following characteristics: volatile, nonvolatile, dynamic, static, read/write, read-only, random access, sequential access, location addressable, file addressable, and content addressable. In some embodiments, logic subsystem 106 and data-holding subsystem 108 may be integrated into one or more common devices, such as an application specific integrated circuit or a system on a chip.

The terms "module," "program," and "engine" may be used to describe an aspect of computing system 104 that is implemented to perform one or more particular functions. In some cases, such a module, program, or engine may be instantiated via logic subsystem 106 executing instructions held by data-holding subsystem 108. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 110 may be used to present a visual representation of data held by data-holding subsystem 108. As the herein described methods and processes change the data held by the data-holding subsystem, and thus transform the state of the data-holding subsystem, the state of display subsystem 110 may likewise be transformed to visually represent changes in the underlying data. As a nonlimiting example, display subsystem 110 may show user interface elements that change responsive to user input in the form of touch contacts, resolved as described herein. Display subsystem 110 may include one or more display devices utilizing virtually any type of technology. Such display devices may be combined with logic subsystem 106 and/or data-holding subsystem 108 in a shared enclosure, or such display devices may be peripheral display devices.

When included, a communication subsystem may be configured to communicatively couple computing system 104 with one or more other computing devices. A communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 104 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of tracking touch contacts, the method comprising:
   resolving a first touch contact applied to a first location of a multi-touch sensor to a first centroid(N) for a frame (N);
   resolving a second touch contact, distinct from the first touch contact, to a second centroid(N) for the frame(N), the second touch contact applied to a second location, different than the first location, of the multi-touch sensor;
   responsive to the first touch contact and the second touch contact moving toward a third location of the multi-touch sensor between the first and second locations and merging into a merged touch contact in a temporally subsequent frame(N+1), resolving the merged touch contact to a first centroid(N+1) and a second centroid (N+1) by assigning a first weight(N+1) and a second weight(N+1) to each particular pixel of the merged contact in frame(N+1), the first weight(N+1) calculated based on data from the first touch contact from frame(N) and the second weight(N+1) calculated based on data from the second touch contact from frame(N).

2. The method of claim 1, further comprising detecting the merged contact at least in part by identifying a continuous contact in frame(N+1) having a combined statistic approximately equal to a sum of an individual statistic of the first touch contact and an individual statistic of the second touch contact.

3. The method of claim 1, further comprising:
calculating the first weight(N+1) of each pixel by multiplying an intensity of the merged touch contact observed at that pixel in frame(N+1) by a first probabilistic likelihood that particular pixel belongs to the first touch contact; and
calculating the second weight(N+1) of each pixel by multiplying an intensity of the merged touch contact observed at that pixel in frame(N+1) by a second probabilistic likelihood that particular pixel belongs to the second touch contact.

4. The method of claim 3, wherein the intensity of the merged touch contact observed at each pixel is acquired from raw touch sensor measurements.

5. The method of claim 3, wherein the first probabilistic likelihood and the second probabilistic likelihood include a Gaussian distribution.

6. The method of claim 3, further comprising:
normalizing the first weight(N+1) and the second weight (N+1) of each pixel such that a sum of the first weight (N+1) and the second weight(N+1) for that pixel equals 1;
normalizing each pixel for the probabilistic likelihood of the first touch contact such that a sum of first weights (N+1) of all pixels of the merged touch contact equals 1; and
normalizing each pixel for the probabilistic likelihood of the second touch contact such that a sum of second weights(N+1) of all pixels of the merged touch contact equals 1.

7. The method of claim 3, further comprising associating a first mean and covariance matrix with the first centroid(N+1) and a second mean and covariance matrix with the second centroid(N+1).

8. The method of claim 3, further comprising calculating a first new probabilistic likelihood from the first centroid(N+1) and a second new probabilistic likelihood from the second centroid(N+1) for weighting pixels in a subsequent frame.

9. The method of claim 1, further comprising detecting the first touch contact, the second touch contact, and the merged touch contact with the multi-touch sensor.

10. A method of tracking touch contacts, the method comprising:
resolving a first touch contact to a first centroid(N) for a frame(N);
resolving a second touch contact, distinct from the first touch contact, to a second centroid(N) for the frame(N);
responsive to the first touch contact and the second touch contact merging into a merged touch contact appearing as a single, continuous touch contact in a temporally subsequent frame(N+1), resolving the merged touch contact to a first centroid(N+1) and a second centroid (N+1) based on data from the first touch contact from frame(N) and data from the second touch contact from frame(N), the resolving comprising, for each particular pixel of the merged touch contact:
assigning a first weight(N+1) to that particular pixel with respect to the first touch contact, the first weight (N+1) being a product of an intensity of the merged touch contact observed at that particular pixel in frame(N+1) and a first probabilistic likelihood that particular pixel belongs to the first touch contact based on the first centroid(N) for the frame(N);
assigning a second weight(N+1) to that particular pixel with respect to the second touch contact, the second weight(N+1) being a product of an intensity of the merged touch contact observed at that particular pixel in frame(N+1) and a second probabilistic likelihood that particular pixel belongs to the second touch contact based on the second centroid(N) for the frame(N);
normalizing the first weight(N+1) and the second weight (N+1) such that a sum of the first weight(N+1) and the second weight(N+1) equals 1;
normalizing each pixel for the probabilistic likelihood of the first touch contact such that a sum of first weights (N+1) of all pixels of the merged touch contact equals 1;
normalizing each pixel for the probabilistic likelihood of the second touch contact such that a sum of second weights(N+1) of all pixels of the merged touch contact equals 1;
resolving the merged touch contact to the first centroid (N+1) of normalized first weights(N+1) and the second centroid(N+1) of normalized second weights(N+1).

11. The method of claim 10, wherein detecting the merged contact includes identifying a continuous contact in frame (N+1) having a combined statistic approximately equal to a sum of an individual statistic of the first touch contact and an individual statistic of the second touch contact.

12. The method of claim 10, wherein the intensity of the merged touch contact observed at each pixel is acquired from raw touch sensor measurements.

13. The method of claim 10, wherein the first probabilistic likelihood and the second probabilistic likelihood include Gaussian distributions.

14. The method of claim 10, further comprising associating a first mean and covariance matrix with the first centroid(N+1) and a second mean and covariance matrix with the second centroid(N+1).

15. The method of claim 10, further comprising calculating a new first probabilistic likelihood from the first centroid(N+1) and a new second probabilistic likelihood from the second centroid(N+1) for weighting pixels in a subsequent frame.

16. The method of claim 15, wherein the first new probabilistic likelihood and second new probabilistic likelihood include a Gaussian distribution.

17. The method of claim 10, further comprising detecting the first touch contact, the second touch contact, and the merged touch contact with a multi-touch sensor.

18. A data-holding subsystem holding instructions, comprising:
instructions to resolve a first touch contact applied to a first location of a multi-touch sensor to a first centroid(N) for a first frame(N), the first touch contact having a first region of maximum intensity;
instructions to resolve a second touch contact, distinct from the first touch contact, to a second centroid(N) for the first frame(N), the second touch contact having a second region of maximum intensity distinct from the first region and applied to a second location, different than the first location, of the multi-touch sensor;

instructions to, responsive to the first touch contact and the second touch contact moving toward a third location of the multi-touch sensor between the first and second locations and merging into a merged touch contact in a second, temporally subsequent frame(N+1), resolve the merged touch contact to a first centroid(N+1) and a second centroid(N+1) by assigning a first weight(N+1) and a second weight(N+1) to each particular pixel of the merged contact in the second frame(N+1), the first weight(N+1) calculated based on data from the first touch contact from frame(N) and the second weight(N+1) calculated based on data from the second touch contact from the first frame(N), the merged touch contact having a single, third region of maximum intensity.

19. The data-holding subsystem of claim 18, wherein the instructions are further executable to verify that the first touch contact and the second touch contact have merged into the merged touch contact based on a sum of an area of the first touch contact and an area of the second touch contact being substantially equal to an area of the merged touch contact.

20. A device, comprising:
a multi-touch sensor;
a circuit in communication with the multi-touch sensor, the circuit configured to:
  resolve a first touch contact applied to a first location of the multi-touch sensor to a first centroid(N) for a frame(N);
  resolve a second touch contact, distinct from the first touch contact, to a second centroid(N) for the frame (N), the second touch contact applied to a second location, different than the first location, of the multi-touch sensor;
  responsive to the first touch contact and the second touch contact moving toward a third location of the multi-touch sensor between the first and second locations and merging into a merged touch contact in a temporally subsequent frame(N+1), resolve the merged touch contact to a first centroid(N+1) and a second centroid(N+1) by assigning a first weight(N+1) and a second weight(N+1) to each particular pixel of the merged contact in frame(N+1), the first weight(N+1) calculated based on data from the first touch contact from frame(N) and the second weight(N+1) calculated based on data from the second touch contact from frame(N).

21. The device of claim 20, wherein the circuit is configured to identify a continuous contact in frame(N+1) having a combined statistic approximately equal to a sum of an individual statistic of the first touch contact and an individual statistic of the second touch contact.

22. The device of claim 20, wherein the circuit is configured to calculate the first weight(N+1) of each pixel by multiplying an intensity of the merged touch contact observed at that pixel in frame(N+1) by a first probabilistic likelihood that particular pixel belongs to the first touch contact; and calculate the second weight(N+1) of each pixel by multiplying an intensity of the merged touch contact observed at that pixel in frame(N+1) by a second probabilistic likelihood that particular pixel belongs to the second touch contact.

23. The device of claim 22, wherein the intensity of the merged touch contact observed at each pixel is acquired from raw touch sensor measurements.

24. The device of claim 22, wherein the first probabilistic likelihood and the second probabilistic likelihood include a Gaussian distribution.

25. The device of claim 22, wherein the circuit is configured to:
  normalize the first weight(N+1) and the second weight(N+1) of each pixel such that a sum of the first weight(N+1) and the second weight(N+1) for that pixel equals 1;
  normalize each pixel for the probabilistic likelihood of the first touch contact such that a sum of first weights(N+1) of all pixels of the merged touch contact equals 1; and
  normalize each pixel for the probabilistic likelihood of the second touch contact such that a sum of second weights (N+1) of all pixels of the merged touch contact equals 1.

26. The device of claim 22, wherein the circuit is configured to associate a first mean and covariance matrix with the first centroid(N+1) and a second mean and covariance matrix with the second centroid(N+1).

27. The device of claim 22, wherein the circuit is configured to calculate a first new probabilistic likelihood from the first centroid(N+1) and a second new probabilistic likelihood from the second centroid(N+1) for weighting pixels in a subsequent frame.

* * * * *